(12) United States Patent
Caves

(10) Patent No.: US 6,226,294 B1
(45) Date of Patent: May 1, 2001

(54) MULTIPLEXING TRAFFIC INTO STRUCTURE BLOCKS IN ATM CELLS

(75) Inventor: Keith Caves, Herts (GB)

(73) Assignee: Nortel Networks Limited, Monteral (CA)

( * ) Notice: Subject to any disclaimer, the term of this patent is extended or adjusted under 35 U.S.C. 154(b) by 0 days.

(21) Appl. No.: 09/077,920

(22) PCT Filed: Jan. 10, 1997

(86) PCT No.: PCT/GB97/00063

§ 371 Date: Jun. 1, 1998

§ 102(e) Date: Jun. 1, 1998

(87) PCT Pub. No.: WO97/26772

PCT Pub. Date: Jul. 24, 1997

(30) Foreign Application Priority Data

Jan. 20, 1996 (GB) .................................. 9601178

(51) Int. Cl.[7] .................................. H04L 12/28
(52) U.S. Cl. .................................. 370/395; 370/474
(58) Field of Search .................................. 370/395, 474

(56) References Cited

U.S. PATENT DOCUMENTS

| | | | |
|---|---|---|---|
| 5,430,715 | * 7/1995 | Corbalis et al. | 370/392 |
| 5,761,343 | * 6/1998 | Haruma et al. | 382/236 |
| 5,774,469 | * 6/1998 | Wirkestrand | 370/473 |
| 5,805,933 | * 9/1998 | Takahashi | 395/892 |
| 6,021,135 | * 2/2000 | Ishihara et al. | 370/474 |

FOREIGN PATENT DOCUMENTS 0 225 714  6/1987 (EP) .

OTHER PUBLICATIONS

Ohta, "A Technique To Detect And Compensate Consecutive Cell Loss In ATM Network", IEEE Infocom '91, 4/91, pp. 781–790.

Covington, "Voice Transport On An ATM Broadband Network", IEEE Globecom '89, pp 1921–1925.

\* cited by examiner

*Primary Examiner*—Hassan Kizou
*Assistant Examiner*—Thien D Tran
(74) *Attorney, Agent, or Firm*—Lee, Mann, Smith, McWilliams, Sweeney & Ohlson

(57) ABSTRACT

Telecommunications traffic is transported between first and second narrow band networks across an ATM network. Traffic from users of the first narrow band network is packetised into structured blocks within ATM cells. Each cell is provided with a respective control information field and with a header for routing the cells across the ATM network to the second narrow band network. The control information field incorporates a length indicator indicative of the size of the structured blocks within that cell whereby to control recovery of the user traffic from the cell.

E = EXTENSION BIT
LI = LENGTH INDICATOR
SN = SEQUENCE NUMBER
CI = CHANGE INDICATOR
ECF = ERROR CORRECTION FIELD

6 Claims, 4 Drawing Sheets

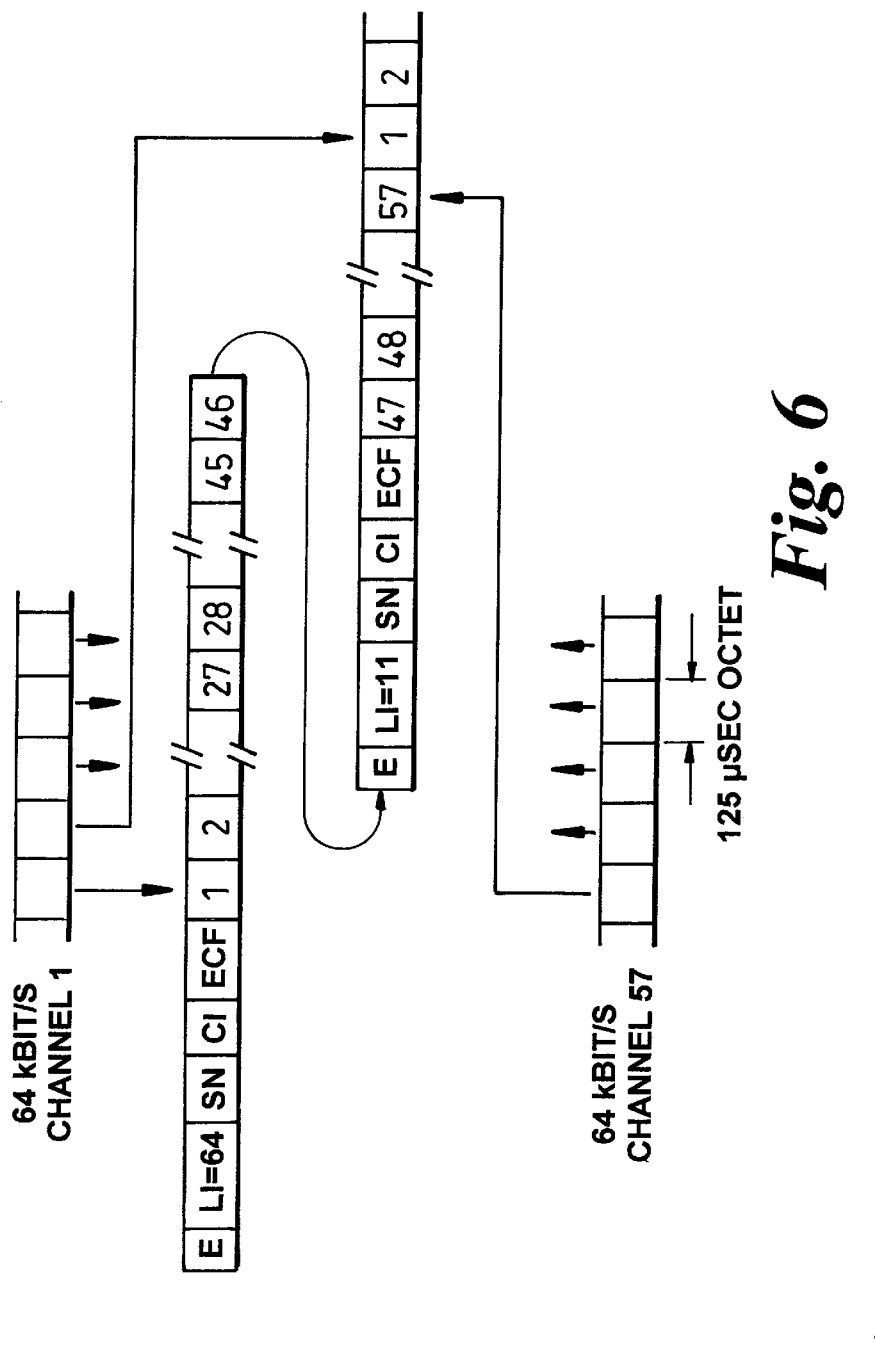

MULTIPLEXING TRAFFIC INTO STRUCTURE BLOCKS IN ATM CELLS

This invention relates to telecommunications networks and in particular to a system and method for asynchronous transfer mode (ATM) transmission of traffic.

BACKGROUND OF THE INVENTION

A recent development in telecommunications technology has been the introduction of the asynchronous transfer mode (ATM) transmission technique. The asynchronous transfer mode (ATM) technology is a flexible form of transmission which allows various types of service traffic, e.g. voice, video or data, to be multiplexed together on to a common means of transmission, the traffic being carried in cells each having a header indicating its destination. The service traffic is adapted typically into 53 byte cells comprising 5 byte headers and 48 byte payloads such that the original traffic can be reconstituted at the far end of the ATM network. This form of adaptation is performed in the ATM adaptation layer (AAL). The technique allows large volumes of traffic to be handled reliably and efficiently.

Specification No EP-A1-0,225,714 describes a communications network comprising a number of nodes and in which short delay limits are met by creating composite packets carrying information for more than one call. A call is allocated one or more octets at a given location in packets having a given connection number. A description of voice transport in an ATM broad band network is given by W O Covington in "Communications Technology for the 1990's and Beyond, Dallas, Nov. 27–30, 1989, Volume 3, 27 November 1989, IEEE, pages 1921–1925.

A limiting factor in the introduction of ATM is the difficulty of interfacing new broad band ATM networks not only with existing narrow band networks, commonly referred to as legacy networks, but also with the newly emerging narrow band cellular and wireless networks. In an attempt to address the latter-mentioned part of this problem, ANSI committee T1S1.5 has recently issued a baseline document containing proposals for a new ATM Adaptation Layer (AAL) that encapsulates and transports short user packets (called AAL-SDUs) inside an ATM cell stream. The new AAL is intended to be applicable to both fixed and variable length short packets and has been named 'Small Multiplexed ATM Adaptation Layer' (SMAAL). SMAAL is intended to support applications such as low bit rate-compressed voice, both with and without silence suppression, leading to both constant bit rate and variable bit rate user information. A consequence of these applications can be the unacceptably long voice packetisation delay that can occur in filling a complete ATM cell with the resulting user information from a single source. The purpose of SMAAL is to permit multiple short packets of user information from one or more users to be multiplexed inside a single ATM cell, thereby alleviating the packetisation delay problems. While this facilitates the transmission of short packets within the ATM network, it does not provide an effective means of interfacing with existing legacy networks, neither basic 64 kbit/s narrow band networks nor narrow band voice networks employing compression and silence suppression techniques.

SUMMARY OF THE INVENTION

The object of the invention is to minimise or to overcome these disadvantages.

A further object of the invention is to provide an improve apparatus and method for the transport of narrow band communications traffic.

According to the invention there is provided a method of transporting traffic between first and second narrow band networks across an asynchronous transfer mode ATM) network, the method including multiplexing traffic from users of the first narrow band network into structured blocks within ATM cells, providing each cell with a respective single control information field (CIF) and a header, transmitting the cells across the ATM network to the second narrow band network, and demultiplexing the user traffic from the transmitted cells, characterised in that said control information field incorporates a length indicator (LI) indicative of the size of the structured blocks within that cell whereby to define the demultiplexing process, that changes in structured block size are signalled via a change indicator (CI) contained in the control information field, and that transport of user information or of signalling information is denoted by a single bit information/signalling (I/S) indicator contained in the control information field.

According to another aspect of the invention there is provided an arrangement for transporting traffic between first and second narrow band networks across an ATM network, the arrangement including means for multiplexing traffic from users of the first narrow band network into structured blocks within ATM cells, means for providing each cell with a respective single control information field and a header, means for transmitting the cells across the ATM network to the second narrow band network, and means for demultiplexing the user traffic from the transmitted cells, characterised in that said control information field incorporates a length indicator indicative of the size of the structured blocks within that cell whereby to define the demultiplexing process, that changes in structured block size are signalled via a change indicator (CI) contained in the control information field, and that transport of user information or of signalling information is denoted by a single bit information/signalling (I/S) indicator contained in the control information field.

The method and arrangement provide for the transport across ATM networks of narrow band 64 kbit/s channels as required for interworking between legacy networks. A single unified transport capability is made available to fulfil the requirements for the ATM trunking of narrow band services, whether constant bit rate or piece wise constant bit rate (as for compressed voice with silence suppression) in character.

BRIEF DESCRIPTION OF THE DRAWINGS

An embodiment of the invention will now be described with reference to the accompanying drawings in which:

FIG. 6 is a schematic diagram illustrating the transport of single structured blocks in multiple ATM cells across the network of FIG. 3; and FIG. 7 shows a control information field used in the transmission protocol of the network structure of FIG. 3 to facilitate the transport of single narrow band channels carrying compressed and/or silence suppressed voice information per single ATM connection.

DESCRIPTION OF PREFERRED EMBODIMENT

Figure 1:
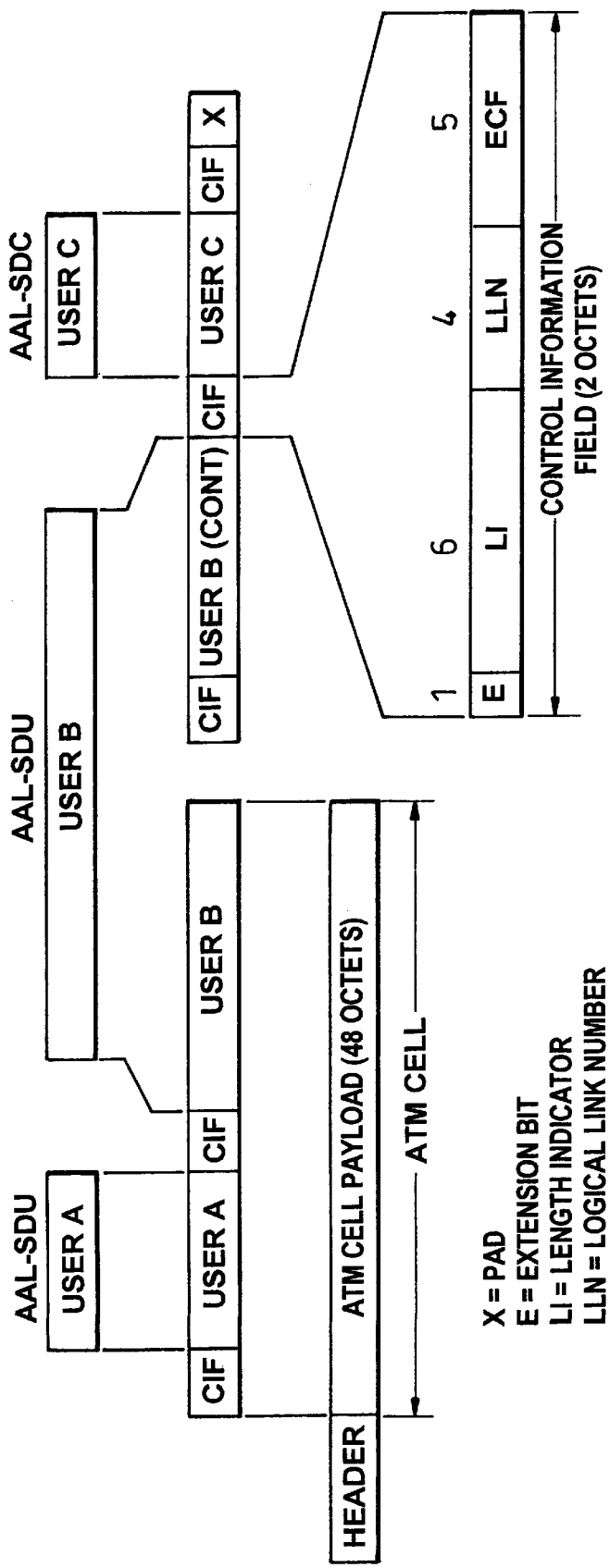
FIG. 1 is a schematic diagram illustrating the SMAAL fields and formats.
Figure 2:
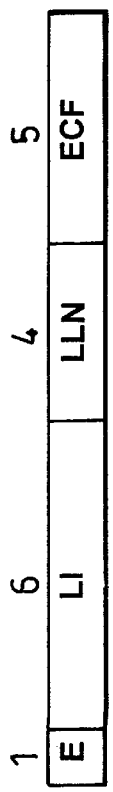
FIG. 2 shows the control information field employed in the SMAAL protocol of FIG. 1.

Reference is first made to FIGS. 1 and 2 which are introduced for comparative purposes and as an aid to the understanding of the invention. FIG. 1 shows the format and composition of the fields of SMAAL. It also illustrates the multiplexing of short packets from multiple users into a SMAAL cell stream. The three information packets (AAL-SDUs) from users A, B and C are appended each to a header called the Control Information Field (CIF) before being multiplexed into the cell stream of a single ATM connection. For efficiency, information from User B is split to straddle two cell payloads; in this case, the second half of the information loaded into the second cell payload also carries a CIF header. At the end of the second cell payload, more than two octets remain following the information from User C. Since there is no more information available to send at this time, the remaining octets are filled by a CIF field plus Pad characters, labelled 'X'. Finally, the ATM cell payloads are encapsulated into ATM cells.

The details of the control information field or CIF are shown in FIG. 2. The meanings of the individual fields are as follows:

the Extension (E) bit is reserved for future use.

the Length Indicator (LI) of 6 bits points to the end of the current packet so that its value is equal to the length of the packet in octets. A value of LI greater than 46 indicates that the end of the current packet lies in the next cell, where the leading CIF contains the length of the remaining part of the packet.

the Logical Link Number (LLN) of 4 bits allows user information from up to 16 sources to be associated with the correct users.

the 5 bit Error Correcting Field (ECF) contains a 4-bit CRC plus a Parity bit. The ECF permits either single bit error correction or error detection to be performed over the CIF.

The rules pertaining to the use of Pad characters at the end of a cell payload are as follows:

with only one octet remaining, fill it with Pad character X.

with exactly two octets remaining, fill them with CIF with LI=0.

with more than two octets remaining and no user information waiting to be sent, fill them with CIF with LI=0 plus Pad characters X.

The present version of SMAAL as described briefly above permits the transport of user information in the form of short fixed or variable length packets, say from 3 to 36 octets in length, between narrow band networks across ATM trunk networks.

Figures 3, 4:
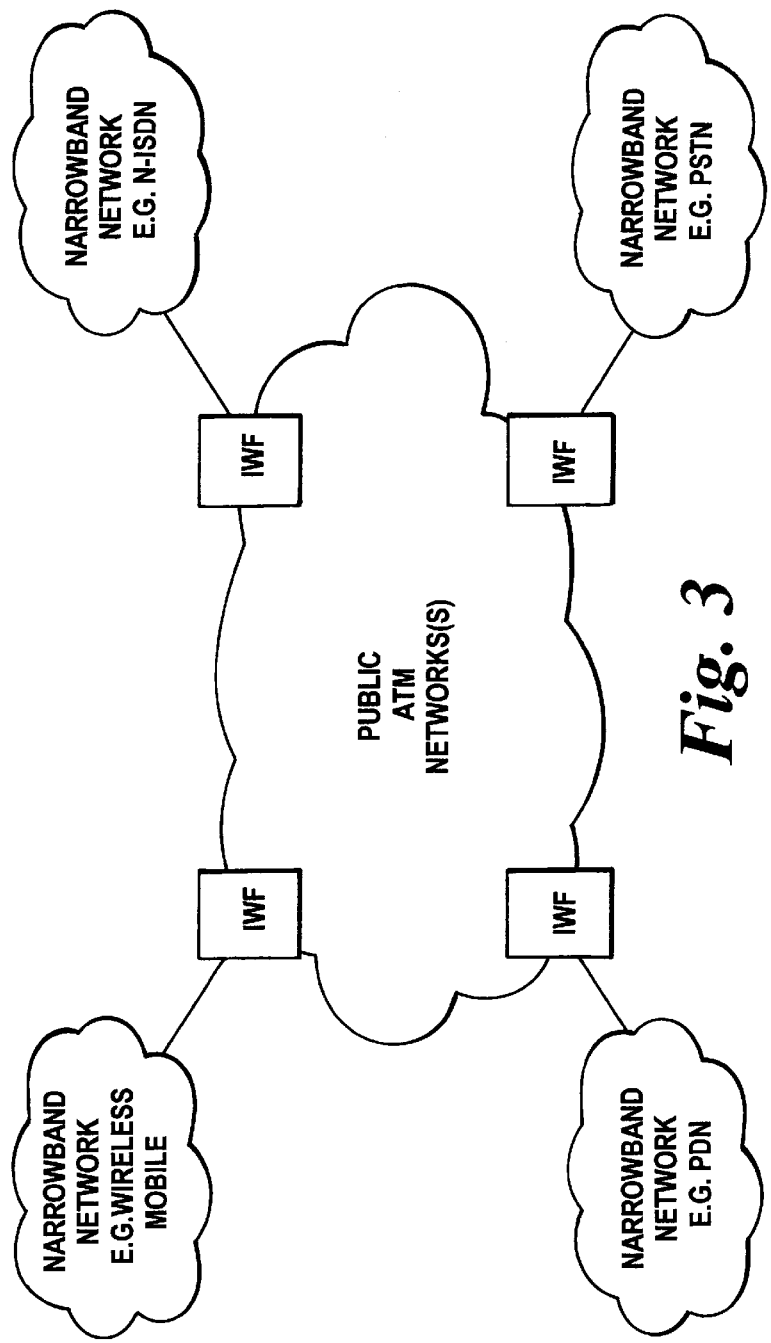
FIG. 3 is a schematic diagram of a telecommunications network structure according to an embodiment of the invention.
FIG. 4 shows a control information field used in the transmission protocol of the network structure of FIG. 3 to facilitate the transport of multiple multiplexed 64 kbit/s narrow band channels in a single ATM connection.

Referring now to FIG. 3, this illustrates a network structure providing interworking between narrow band networks via an ATM network, e.g. a public network. In the network structure of FIG. 3, narrow band channels are transported across the public ATM network between pairs of Interworking Functions (IWF) each providing an interface between the respective narrow band network and the ATM network. For maximum efficiency and cost effectiveness, ATM connections carrying multiplexed information from multiple users may be set up between the IWF pairs for this purpose.

If we consider the information typically originating from legacy 64 kbit/s narrow band networks, this is in the form of short packets of 1 octet in length. We have found that the transport of such information between 64 kbit/s narrow band networks and other narrow band networks can be achieved by the transport between IWFs of multiple octets multiplexed on to a single ATM connection. We have also found that, in order to transport such information, there is no need to carry the overhead of a CIF per packet. This is because the octets originating from a 64 kbit/s narrow band network may be carried in structured blocks. Thus, if 83 channels need to be transported between IWFs, one octet per channel can be multiplexed into the ATM cell stream every 125 microseconds to form a repetitive 83 octet structure. By using this structure we require a single control information field (CIF) per ATM cell to recover the individual channels at the destination IWF. This control information field is shown in FIG. 4. The LI field in our CIF points to the end of the structure block. A value of all ones in the LI field indicates that the end of the structure was not in the current cell.

Operation of structured information transfer in the manner described above with reference to FIGS. 3 and 4 preferably requires a sequence number to be associated with each cell payload, so that missing and misinserted cells can be detected. Since our structured transfer has no need for the conventional CIF's Logical Link Number field (LLN), 3 bits of the LLN may be allocated to convey a sequence number (SN).

T number of channels being transported may be varied dynamically. This is effected via a signalling exchange between IWFs in order to agree on the parameters of the new structure, following which an in band change indicator synchronises the exact instant of structure change. To achieve this, the fourth bit of the LLN field can be used as a change indicator, a change in the sense of this bit being used to convey the time of structure change.

Figure 5:
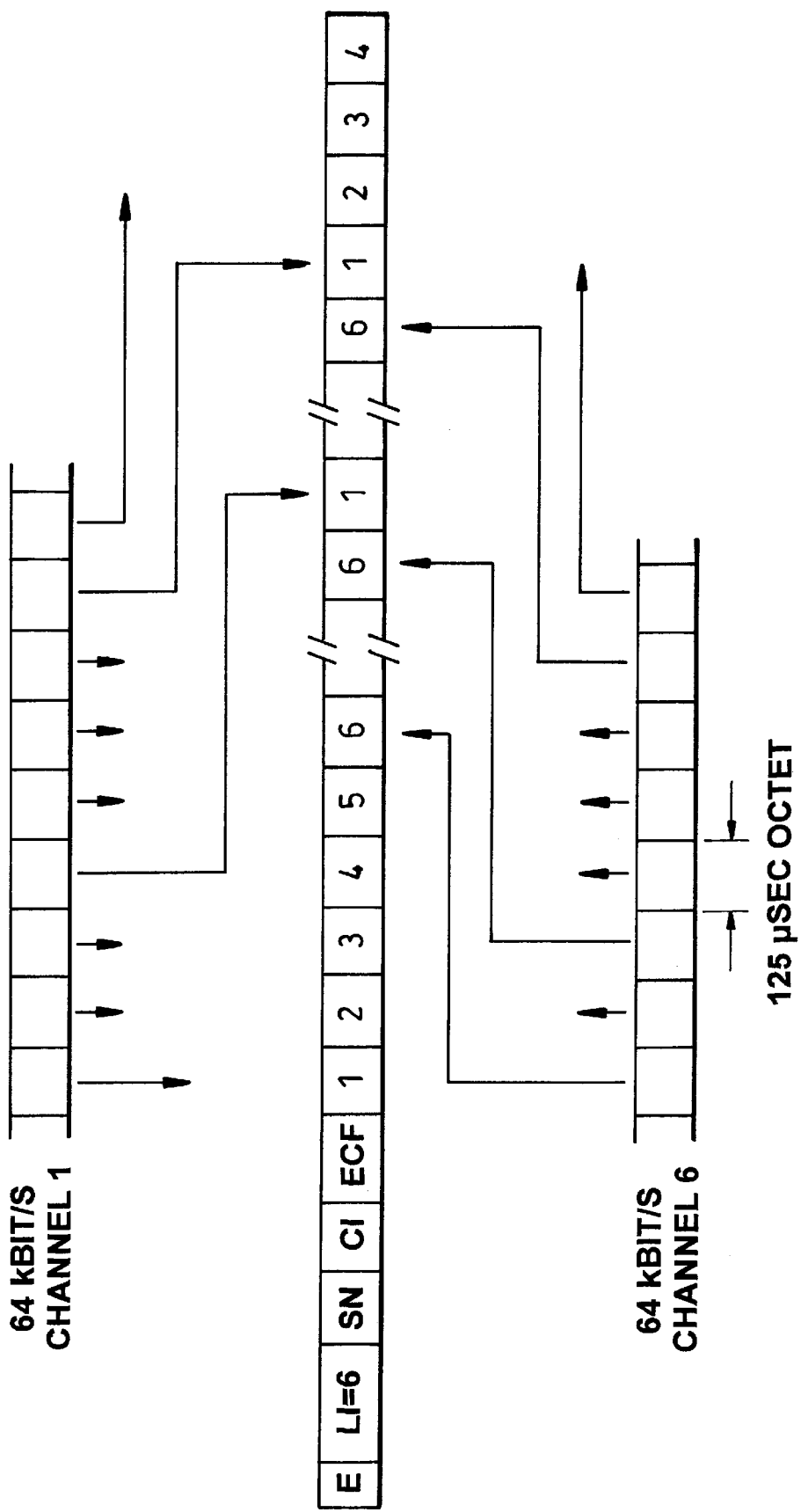
FIG. 5 is a schematic diagram illustrating the transport of multiple structured blocks in single ATM cells across the network of FIG. 3.

FIG. 5 shows an example of the use of our transmission technique to transport multiple 64 kbit/s-based block structures per ATM cell, with the size of the block structure equal to 6 in this case. Every 125 microseconds, a block of 6 octets is collected, one from each of the 6 channels to be transported, and grouped in sequence in the ATM cell payload. In the figure, only channels 1 and 6 are shown, for clarity. As shown in the example, the cell payload thus holds 7 full blocks of 6 octets, plus octets from the 8th block belonging to channels 1 to 4. The LI value in the CIF indicates that the end of the first structure block occurs at octet number 6. Since four octets of the 8th structure block appear in the payload shown in FIG. 5, only two octets of the 8th structure block will appear in the next cell payload so that an LI value of 2 would be indicated.

FIG. 6 shows an example of the use of our transmission technique to transport a single 64 kbit/s-based block structure in more than one ATM cell, with the size of the block structure equal to 57 in this case. Every 125 microseconds, a block of 57 octets is collected, one from each of the 57 channels to be transported, and grouped in sequence in the payloads of either two or three ATM cells. In the figure, only channels 1 and 57 are shown, for clarity. As shown in the example, the first cell payload holds 46 octets of the 57 octet structure block. The LI value in the CIF is set to 64 indicating that the end of the structure block does not occur in this cell. Since the remaining eleven octets of the structure block appear in the following cell payload, an Li value of 11 indicates where the end of the 57 octet block structure occurs.

The method described above may be adapted to handle traffic originating from narrow band voice networks which employ optional compression and silence suppression techniques. Typically, such networks operate in a default mode at 64 kbit/s but when using compression, rates of 32, 24 and 16 kbit/s are common. The resulting compressed voice traffic is of constant bit rate in character but becomes piece-wise constant bit rate when silence suppression is invoked. Often, these networks arrange for an in band negotiation procedure between voice terminals subsequent to the connection set-up phase of a call, in order to agree the characteristics of any compression and/or silence suppression to be used during voice information transfer. Occasionally, the network may arrange to vary these characteristics on existing calls automatically to reflect the current congestion within the network. We have found that the transport of such variable constant bit rate and piece-wise constant bit rate information between IWFs can be achieved conveniently by the transport of a single narrow band channel per ATM connection. With silence suppression in which transmission is halted during the gaps between speech bursts, the extent of the fill of a given cell payload may be variable and unpredictable. In addition, the amount of time required to fill the payload of an ATM cell with information from a single voice channel will vary depending on the degree of compression being used and to limit this variability, partial cell fill may be required in certain circumstances. To achieve this capability we provide a single control information field (CIF) per ATM cell to recover the information from individual channels at the destination IWF. This control information field is shown in FIG. 7. The LI field indicates the end of the voice information being carried by the cell payload.

Operation of single channel information transfer in the manner described above with reference to FIGS. 4 and 7 preferably requires a sequence number to be associated with each cell payload, so that missing and misinserted cells can be detected. Since our single channel transfer has no need for the conventional CIF's Logical Link Number field (LLN), 3 bits of the LLN may be allocated to convey a sequence number (SN).

In a further modification, the cell payload being transported between IWFs may carry either voice information or in band signalling. In band signalling may be used as described previously at the beginning of a call to agree the compression characteristics for the call. It may also be used during the call to alter the call characteristics or to convey background noise levels to be used at the destination IWF during periods of silence suppression or for other purposes. This alternate cell payload use is effected by means of an indicator carried within the control information field which indicates whether a cell payload carries voice information or inbound signalling information. To achieve this, the fourth bit of the LLN field can be used as an information/signalling indicator, a value of zero indicating voice information and a value of one indicating signalling information.

The transmission techniques described above make it possible to use the same basic ATM Adaptation Layer for the transport across an ATM trunk network of multiple narrow band services, including:

constant bit rate compressed voice services at multiple bit rates piece wise constant bit rate voice services with silence suppression, again with multiple bit rates constant bit rate 64 kbit/s and n×64 kbit/s narrow band services.

Although the transmission technique has been described with reference to the transport of traffic between narrow band legacy networks, it will be appreciated that it is not limited to that particular application but is of general application in the ATM transmission field.

What is claimed is:

1. A method of transporting traffic between first and second narrow band networks across an asynchronous transfer mode (ATM) network, the method including multiplexing traffic from users of the first narrow band network into structured blocks within ATM cells, providing each cell with a respective single control information field (CIF) and a header, transmitting the cells across the ATM network to the second narrow band network, and demultiplexing the user traffic from the transmitted cells, characterised in that said control information field incorporates a length indicator (LI) indicative of the size of the structured blocks within that cell whereby to define the demultiplexing process, that changes in structured block size are signalled via a change indicator (CI) contained in the control information field, and that transport of user information or of signalling information is denoted by a single bit information/signalling (I/S) indicator contained in the control information field.

2. A method as claimed in claim 1, characterised in that the control information field is provided with a sequence number whereby to identify missing or misinserted cells.

3. A method as claimed in claim 1, characterised in that the control information field is provided with a sequence number whereby to identify missing or misinserted cells.

4. A method as claimed in claim 1, characterised in that said traffic comprises narrow band voice traffic.

5. An arrangement for transporting traffic between first and second narrow band networks across an ATM network, the arrangement including means for multiplexing traffic from users of the first narrow band network into structured blocks within ATM cells, means for providing each cell with a respective single control information field and a header, means for transmitting the cells across the ATM network to the second narrow band network, and means for demultiplexing the user traffic from the transmitted cells, characterised in that said control information field incorporates a length indicator indicative of the size of the structured blocks within that cell whereby to define the demultiplexing process, that changes in structured block size are signalled via a change indicator (CI) contained in the control information field, and that transport of user information or of signalling information is denoted by a single bit information/signalling (I/S) indicator contained in the control information field.

6. An arrangement as claimed in claim 5, characterised in that the control information field is provided with a sequence number whereby to identify missing or misinserted cells.

* * * * *